United States Patent [19]

Kvasnikoff et al.

[11] Patent Number: 5,185,140
[45] Date of Patent: Feb. 9, 1993

[54] PROCESS FOR REMOVING SULPHUR COMPOUNDS FROM A RESIDUAL GAS

[75] Inventors: Georges Kvasnikoff, Monein; Jean Nougayrede, Pau; André Philippe, Orthez, all of France

[73] Assignee: Elf Aquitaine Production, Paris, France

[21] Appl. No.: 675,125

[22] Filed: Mar. 25, 1991

Related U.S. Application Data

[63] Continuation of Ser. No. 384,885, Jul. 24, 1989, abandoned, which is a continuation of Ser. No. 75,745, Jun. 25, 1981, abandoned.

[30] Foreign Application Priority Data

Oct. 25, 1985 [FR] France ................................ 8515905

[51] Int. Cl.$^5$ .......................................... C01B 17/04
[52] U.S. Cl. ...................... 423/574 R; 422/171; 422/172; 422/173; 422/190
[58] Field of Search .................. 423/574 R, 576; 422/168-173, 189, 190

[56] References Cited

U.S. PATENT DOCUMENTS

| | | | |
|---|---|---|---|
| 2,889,207 | 6/1959 | Elliot | 423/574 R |
| 3,702,884 | 11/1972 | Hunt, Jr. et al. | 423/574 R |
| 4,097,585 | 6/1978 | Fisher | 423/576 |
| 4,180,554 | 12/1979 | Goddin, Jr. et al. | 423/574 R |
| 4,309,402 | 1/1982 | Al-Muddarris | 423/574 R |
| 4,430,317 | 2/1984 | Reed et al. | 423/574 R |
| 4,436,716 | 3/1984 | Kvasnikoff et al. | 423/574 R |
| 4,479,928 | 10/1984 | Voirin | 423/574 R |
| 4,552,746 | 10/1985 | Kettner et al. | 423/573 G |
| 4,605,546 | 8/1986 | Voirin | 423/574 R |
| 4,980,146 | 12/1990 | Kvasnikoff et al. | 423/574 R |
| 5,132,098 | 7/1992 | Kvasnikoff et al. | 423/574 R |

FOREIGN PATENT DOCUMENTS 1307716 4/1970 United Kingdom ............ 423/574 R

Primary Examiner—R. Bruce Breneman
Attorney, Agent, or Firm—Weiser & Stapler

[57] ABSTRACT

Process for removing sulphur-containing compounds from a residual gas with recovery of said compounds in the form of sulphur, wherein the residual gas is subjected to a treatment comprising a hydrogenation and a hydrolysis phase to provide the sulphur-containing compounds in the unique form of $H_2S$, a cooling step with water condensation, a catalytic oxidation of $H_2S$ in CLAUS stoechiometry and a catalytic CLAUS reaction phase with deposition of sulphur on the CLAUS catalyst and periodic regeneration of the sulphur-laden catalyst and cooling of the regenerated catalyst. The gas used for the regeneration and for the cooling is tapped from the gas effluent supplied to the catalytic oxidation and the gas issued from the regeneration is reintroduced at least in part into said gas effluent after separation of the sulphur containing therein. Application to the purification of residual gases issued from CLAUS sulphur units.

39 Claims, 1 Drawing Sheet

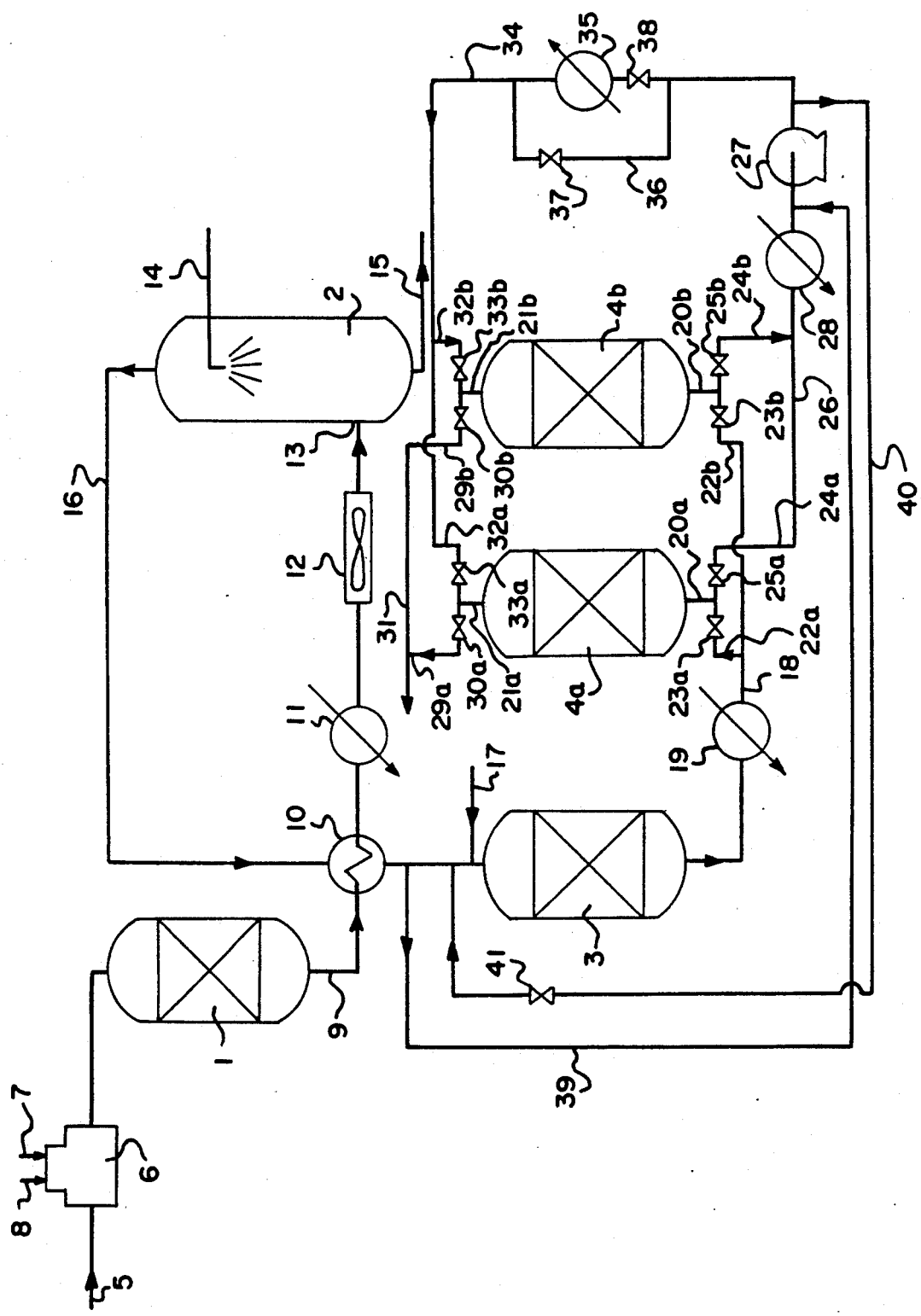

PROCESS FOR REMOVING SULPHUR COMPOUNDS FROM A RESIDUAL GAS

This application is a continuation of application Ser. No. 07/384,885 filed Jul. 24, 1989 now abandoned, which in turn is a continuation of application Ser. No. 07/075,745 filed Jun. 24, 1987, now abandoned.

The invention concerns a process for removing sulphur-containing compounds from a residual gas and especially from a residual gas issued from CLAUS sulphur plants with recovery of the said compounds as sulphur.

The residual gases issued from a sulphur plant in which the sulphur is produced by the process wherein a sour gas containing $H_2S$ is submitted to partial oxidation, known under the name of CLAUS process, contain about 0.2 to 2% by volume of sulphur-containing compounds of which a large proportion consists of $H_2S$, the remainder being constituted by $SO_2$, COS, $CB_2$ and vapor and/or vesicular sulphur.

Such residual gases are currently treated to lower as much as possible the overall sulphur-containing compounds with the aim of allowing them to be discarded into the atmosphere, after having incinerated them, while respecting the standards imposed by the local legislation with respect to atmospheric pollution and simultaneously recovering these sulphur-containing compounds in a form contributing to increase of the content in vaporisable products from sour gas treated in the sulphur plant.

Various processes are known to carry out the treatment of a residual gas issued from a CLAUS sulphur plant and especially processes comprising a combined treatment of hydrogenation and hydrolysis of the residual gas with the aim of directing the sulphur-containing compounds that it contains in the unique form of $H_2S$, then in cooling the effluent resulting from the said combined treatment at a suitable temperature in order to condense the greatest proportion of the water vapor contained in this effluent and furthermore a treatment of the water lean gaseous effluent in order to remove $H_2S$, this removal of $H_2S$ being carried out either by $H_2S$ absorption by means of a regenerable selective solvent or again by catalytic partial oxidation of $H_2S$ to sulphur.

Among the processes of the type mentioned above comprising $H_2S$ removal by catalytic oxidation into sulphur can be cited a process in which, after the combined hydrogenation and hydrolysis treatment of the residual CLAUS gas and cooling of the resulting gaseous effluent to condense the greater proportion of the water vapor, the water lean effluent is passed with a controlled quantity of a free oxygen-containing gas, at a temperature higher than 150° C., into contact with a catalyst for oxidizing $H_2S$ into sulphur in order to form a gaseous stream containing $H_2S$ and $SO_2$ in a $H_2S:SO_2$ molar ratio substantially equal to 2:1 as well as some elementary sulphur, then the said gaseous stream is directed, after cooling below 160° C. and possibly separation from the sulphur that it contains, into contact with a CLAUS catalyst operating at a temperature low enough that the sulphur to be formed through reaction of $H_2S$ with $SO_2$ be retained on the catalyst with production of a residual gaseous effluent having a greatly reduced sulphur-containing compounds content that is subjected to an incineration prior to being rejected into the atmosphere and the sulphur-laden CLAUS catalyst is periodically swept by means of a non-oxidizing gas having a temperature comprised between 200° C. and 500° C. to vaporize the sulphur retained by this catalyst and to thus ensure the regeneration of this latter, then the regenerated catalyst is cooled to the temperature required for a fresh contacting with the $H_2S$ and $SO_2$ containing gas, i.e. with the gaseous stream issued from the oxidation.

It is furthermore known that the efficiency of the above-mentioned technique for regenerating the sulphur-laden CLAUS catalyst can be improved by incorporating into the sweeping gas a certain amount of a reducing gas such as CO, $H_2$ and more particularly $H_2S$, which allows to confer upon the regenerated CLAUS catalyst an activity close to the original activity, even after a high number of regenerations. The sweeping gas used for this purpose is usually formed by mixing a substantially inert carrier gas, for example constituted by nitrogen or a part of the purified residual gas from a sulphur plant, with an appropriate amount of a $H_2S$-containing gas and especially the sour gas treated in the sulphur plant.

The object of the invention is a process for removing sulphur-containing compounds contained in a residual gas and especially in a residual gas issued from a CLAUS sulphur plant with recovery of the said compounds in the form of sulphur, which comprises a phase for regenerating a sulphur-laden CLAUS catalyst through sweeping by means of a non-oxidizing hot gas containing $H_2S$, the said regenerating phase being carried out in such a manner as to avoid the utilization of the sour gas treated in the sulphur plant.

The process according to the invention is of the type in which the residual gas is subjected to a combined hydrogenation and hyhdrolysis treatment in order to bring the sulphur-containing compounds that it contains under a unique $H_2S$ form, the gaseous effluent issued from the said combined treatment is cooled in order to condense the water vapor that it contains, the water-lean gaseous effluent obtained, after heating to the required temperature and addition to the said effluent of a controlled quantity of a free oxygen-containing gas, is passed into contact with a catalyst for oxidizing $H_2S$ into sulphur at a temperature higher than 150° C. in order to form a $H_2S$ and $SO_2$ containing gaseous stream in a $H_2S:SO_2$ molar ratio substantially equal to 2:1 as well as elementary sulphur, the said gaseous stream is brought, after cooling to below 160° C. and possibly separation of the sulphur contained therein, into contact with a CLAUS catalyst, operating at a sufficiently low temperature for the sulphur that is formed by reaction of $H_2S$ on $SO_2$ to be deposited on the catalyst, to form a fresh quantity of sulphur and produce a purified residual gas, that is rejected into the atmosphere after possibly having been incinerated, and the sulphur-laden CLAUS catalyst is periodically subjected to a regeneration through sweeping by means of a $H_2S$ containing non-oxidizing gas having a temperature comprised between 200° C. and 500° C. and the regenerated catalyst is cooled to the required temperature for a fresh contacting with the $H_2S$ and $SO_2$ containing gas, and it is characterized in that part or the whole of the water-lean gaseous effluent is used, prior to being put into the presence of the free oxygen-containing gas, to generate the sweeping gas which, after heating to the appropriate temperature comprised between 200° and 500° C., regenerates the sulphur-loaded CLAUS catalyst and in that the gaseous effluent brought with the free oxygen-containing gas into contact with the oxidation catalyst, is constituted by a volume of sweeping gas issued from the regeneration and possibly freed by condensation from the greatest proportion of the sulphur that it contains, which corresponds substantially to the volume of the water-lean gaseous effluent used to generate the sweeping gas and to which is added, if it exists, the water-lean gaseous effluent quantity not used for generating the sweeping gas acting for the regeneration.

According to one embodiment of the invention, the totality of the water-lean gaseous effluent is used for generating the sweeping gas acting for the regeneration of the sulphur-laden CLAUS catalyst and the totality of the sweeping gas issued from the said regeneration is used, after possible separation of the largest proportion of the sulphur that it contains by condensation, to constitute the gaseous effluent that is directed with the free oxygen-containing gas into contact with the oxidation catalyst.

According to another embodiment of the invention, a fraction of the gaseous water-lean effluent is tapped, prior to being incorporated to the said free oxygen-containing gas, and the gaseous fraction thus tapped is used for generating the sweeping gas acting for the regeneration of the sulphur-laden CLAUS catalyst and a fraction of sweeping gas issued from the regeneration is reintroduced into the water-lean gaseous effluent, upstream from the addition point of the free oxygen-containing gas, after having freed the said sweeping gas fraction from the greatest proportion of the sulphur that it contains by condensation, the said sweeping gas fraction issued from the regeneration having a volume substantially equal to that of the fraction tapped on the water-lean gaseous effluent in order to generate the sweeping gas used for the regeneration.

During the combined hydrogenation and hydrolysis step, which is usually carried out in the presence of a catalyst, the sulphur-containing compounds such as $SO_2$, $CS_2$, COS as well as the vapor and/or vesicular sulphur contained in the residual gas are transformed into $H_2S$ either under the action of hydrogen, in the case of $SO_2$ and of vapor and/or vesicular sulphur, or by hydrolysis, in the case of COS and $CS_2$, under the action of water vapor present in the said residual gas. The combined hydrogenation and hydrolysis treatment is carried out at temperatures ranging from about 140° C. to 550° C. and preferably from about 200° C. to 400° C. The hydrogen necessary for the hydrogenation reaction can already be contained in the residual gas or be formed in situ in the hydrogenation and hydrolysis zone, for example by reaction of CO on $H_2S$ when the residual gas contains both these reactants, or again to be added to the residual gas from an external hydrogen source. A practical way to supply $H_2$ and CO to residual gas consists in adding to the said residual gas combustion gases produced by a combustible gas burner functioning in sub-stoechiometry. The quantity of hydrogen to be used must be sufficient to obtain a practically complete transformation into $H_2S$ of the hydrogen-able sulphur-containing products or compounds, such as $SO_2$, vapor and/or vesicular sulphur, contained in the residual gas subjected to the hydrogenation and hydrolysis treatment. In practice, the amount of hydrogen used can be comprised within 1 to 6 times the stoichiometric quantity required to transform into $H_2S$ the hydrogenable sulphur-containing products present in the residual gas.

If the residual gas does not contain sufficient water vapor for the hydrolysis of the COS and CS sulphur organic compounds, it is possible to add the required quantity of water vapor prior to carrying out the combined hydrogenation and hydrolysis treatment.

Catalysts that can be used for the hydrogenation and hydrolysis treatment are those which contain compounds of metals belonging to groups Va, VIa and VIII of the Periodic Classification of Elements, for example, compounds of metals such as cobalt, molybdenum, chromium, vanadium, thorium, nickel, tungsten, uranium, the said compounds being possibly deposited on a silica, alumina, silica/alumina type support. For the hydrogenation and hydrolysis treatment, the hydrodesulfurization catalysts based on cobalt and molybdenum oxides deposited on alumina are particularly effective. For this hydrogenation and hydrolysis treatment, the contacting times between the gaseous reaction medium and the catalyst can vary rather widely. It is advantageously comprised between 0.5 and 8 seconds and more particularly between 1 and 5 seconds, these values being given under normal pressure and temperature conditions.

The gaseous effluent resulting from the combined hydrogenation and hydrolysis treatment of the residual gas, is subjected to a cooling, carried out by means of any known technique and, for example, by indirect heat exchange with a colder fluid and/or by water spraying, to bring its temperature to a sufficiently low value to condense the greatest part of the water vapor that it contains. Advantageously, the said cooling is carried out in such a manner as to bring the water vapor content of the cooled gaseous effluent to a value lower than about 10% in the volume.

The cooled gaseous effluent with a reduced content of water vapor is thereafter heated to a temperature compatible with the temperature at which it is desired to carry out the $H_2S$ oxidation, this heating being carried out, for instance, by indirect heat exchange with the hot gaseous effluent that it is desired to cool in order to separate therefrom the water vapor by condensation, then added with the required amount of free oxygen-containing gas, this addition being performed either during the contacting of the said gaseous effluent with a reduced water-vapor content with the oxidation catalyst operating at temperatures higher than 150° C. or, preferably, prior to the said contacting.

The free oxygen-containing gas used to oxidize $H_2S$ contained in the hydrogenated gaseous effluent is generally air, although it is possible to use pure oxygen, oxygen-enriched air, or mixtures, in various proportions, of an inert gas other than nitrogen and oxygen. The free oxygen-containing gas is used, as indicated hereinabove, in a controlled quantity so that there is an amount of oxygen corresponding to that is exactly necessary for partially oxidizing $H_2S$ into $SO_2$ so as to form a $H_2S$ and $SO_2$ containing gaseous effluent in a $H_2S:SO_2$ molar ratio equal to about 2:1 as well as a certain quantity of sulphur.

The control of the quantity of the free oxygen-containing gas is carried out in any known manner, for example by determining the value of the $H_2S:SO_2$ molar ratio in the gaseous stream resulting from the oxidation and by varying the flow-rate of the free oxygen-containing gas used for the oxidation in response to a control value elaborated from the results of these determinations, to maintain the said $H_2S:SO_2$ molar ratio at a value of 2:1.

The contacting times of the gaseous reaction medium with the oxidation catalyst can be comprised between 0.5 and 10 seconds, these values being given under normal pressure and temperature conditions.

The oxidation catalyst can be selected from among the various catalysts adapted to promote H$_2$S oxidation by oxygen in CLAUS stoechiometry, i.e. according to the following reaction schema:

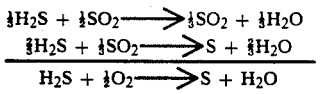
$$\frac{\frac{1}{3}H_2S + \frac{1}{3}SO_2 \longrightarrow \frac{1}{3}SO_2 + \frac{1}{3}H_2O}{\frac{2}{3}H_2S + \frac{1}{3}SO_2 \longrightarrow S + \frac{2}{3}H_2O}$$
$$H_2S + \tfrac{1}{2}O_2 \longrightarrow S + H_2O$$

which leads to the production of a gaseous stream containing elementary sulphur as well as H$_2$S and SO$_2$ in a H$_2$S:SO$_2$ molar ratio substantially equal to 2:1.

In particular, the oxidation catalyst used in the process according to the invention is advantageously selected from the group comprising:

I. the catalysts resulting from the association of at least one compound of a metal selected from among Fe, Ni, Co, Cu and Zn with a silica and/or alumina support, which are described in French patent No. 75 31769 (publication No. 2 327 960) of 17.10.1975;

II. the titanium oxide-based catalysts and in particular those catalysts resulting from the association of titanium oxide and an alkaline-earth metal sulfate such as calcium sulfate, that are proposed in French patent No. 81 05029 (publication No. 2 501532) dated 13.03.1981;

III. the catalysts resulting from the association of at least one compound of a metal taken from the group comprising Fe, Cu, Cd, Zn, Cr, Mo, W, Co, Ni and Bi and possibly at least one compound of a noble metal such as Pd, Pt, Ir and Rh with a silica and/or titanium oxide support, the support containing a small amount of alumina, which are disclosed in French patent No. 81 15900 (publication No. 2 511 663) dated 19.08.1981;

IV. the catalysts formed by associating at least one metal compound selected from the group cited in III) above with a support consisting of an active alumina support thermally stabilized especially by a small amount of at least one rare earth oxide, which are described in German patent application published under No. 3 402 328.

Advantageously, it is possible to constitute the oxidation catalyst by using a type II, III or IV catalyst that is followed by a type I) catalyst, with the advantage that the gaseous stream issued from the oxidation no longer contains oxygen, the aim being to prevent any disactivation of the CLAUS catalyst in the subsequent phase of the treatment.

The H$_2$S oxidation reaction in CLAUS stoechiometry can be carried out at temperatures comprised between 150° C. and 1000° C. and the oxidation catalyst is selected from among those which present a thermal stability sufficient at the prevailing temperature. Thus, type I) catalysts or catalysts including a catalyst of this type can be used up to about 400° C., type II) catalysts up to about 500° C., type III) catalysts up to about 700° C. and type IV) catalysts up to about 1000° C.

The gaseous stream issued from the oxidation contains vaporized sulphur as well as H$_2$S and SO$_2$ in a H$_2$S:SO$_2$ molar ratio equal to about 2:1. This gaseous stream is subjected to a cooling in order to bring its temperature to a value such that the greatest proportion of the sulphur that it contains is separated by condensation, then it is contacted with the CLAUS catalyst at a temperature sufficiently low that the sulphur to be formed by reaction of H$_2$S with SO$_2$ is deposited on the catalyst, this temperature being advantageously comprised between about 120° C. and 140° C., to produce a fresh quantity of sulphur. Periodically, the regeneration of the sulphur-laden CLAUS catalyst is performed by sweeping the said catalyst by means of a H$_2$S containing non-oxidizing gas having a temperature comprised between 200° C. and 500° C., then the regeneration catalyst is cooled to the required temperature for a fresh contacting with the H$_2$S and SO$_2$ containing gas, i.e. with the gaseous stream issued from the oxidation.

The reaction of SO$_2$ with H$_2$S on the CLAUS catalyst is generally carried out in a plurality of catalytic conversion zones, that so operate that at least one of the said zones is in regeneration/cooling phase while the other zones are in reaction phase. It is also possible to operate with one or several zones in reaction phase at least one zone in regeneration phase and at least one zone in cooling phase.

The CLAUS catalyst can be any one of the catalysts adapted to promote the reaction between H$_2$S and SO$_2$ and can consist especially in alumina, bauxite, silica, natural or synthetic zeolite, catalyst of type I) mentioned herein-above or in mixtures of such products.

The purified residual gas issued from the contacting with the CLAUS catalyst is generally subjected to a thermal or catalytic incineration, in order to transform into SO$_2$ all the sulphur compounds that it can still contain in small quantities, prior to being rejected into the atmosphere.

The regeneration of the sulphur-loaded CLAUS catalyst is carried out by sweeping the said catalyst by means of the sweeping gas, which has been generated as indicated herein-above and heated to a suitable temperature comprised between 200° C. and 500° C., and the sweeping gas issued from the regeneration is used, possibly after separation of the greatest part of sulphur contained therein by condensation, in order to form as indicated herein-above the gaseous effluent brought with the free oxygen-containing gas into contact with the oxidation catalyst. At the end of the regeneration, the sweeping of the catalyst is continued by means of the sweeping gas at a temperature lower than about 160° C. to cool the catalyst and bring it to the temperature required for its contacting with the gaseous stream issued from the oxidation.

BRIEF DESCRIPTION OF THE DRAWING

The invention will be rendered more apparent from the following description of one of the embodiments using the device schematically represented on the figure of the appended drawing.

This device associates a hydrogenation and hydrolysis reactor 1, a washing tower 2, an oxidation reactor 3 and two CLAUS catalytic converters 4a and 4b, the said converters being mounted in parallel. The reactor 1 is provided on the one hand with a pipe 5 for supplying the residual gas to be treated issued from the sulphur plant, on which is intercalated a burner 6 provided with a combustible gas supply tubing 7 and an air intake tubing 8, and on the other hand a duct 9 for evacuating the gases. The said duct 9 is connected, through the hot circuit of an indirect heat exchanger 10 of the gas/gas exchanger type, then a low pressure vapor-producing heat exchanger 11 and an aerorefrigerating device 12, to a mouth piece 13 opening in the lower half of the washing tower 2. This latter comprises a water spraying pipe 14 mounted in its upper half and is provided, furthermore, at the bottom, with a liquid evacuation pipe 15 and, at the top, with a gas evacuation pipe 16, this latter pipe connecting the washing tower to the inlet of the oxidation reactor 3 through the cold circuit of the heat exchanger 10. Adjacent to the inlet of the oxidation reactor, the pipe 16 is provided with a gas addition tubing 17 mounted in derivation while the oxidation reactor is fitted with an outlet pipe 18 upon which is mounted a condenser 19.

The catalytic converters 4a and 4b are provided with first pipes, respectively 20a and 20b, and second pipes, respectively 21a and 21b, located on either side of the catalyst. The pipe 20a of the converter 4a is connected on the one hand, by a pipe 22a provided with a valve 23a, to the pipe 18 downstream from the condenser 19 and on the other hand, by a pipe 24a provided with a valve 25a, to a pipe 26 connected in turn to an aspiration inlet of a blower 27 and upon which is mounted a sulphur condenser 28. Furthermore, the pipe 20b of the converter 4b is connected on the one hand by a pipe 22b provided with a valve 23b, to the outlet pipe 18 of the oxidation reactor downstream from the junction of the pipe 22a with the said pipe 18 and on the other hand, by a pipe 24b provided with a valve 25b, to the pipe 26 in a point of this latter located between the pipe 24a and the sulphur condenser 28.

The pipe 21a of the converter 24a is connected, on the one hand, through a pipe 29a provided with a valve 30a, to a pipe 31 for evacuating the purified residual gas towards an incineration reactor (not represented) and therefrom into the atmosphere and on the other hand, by a pipe 32a provided with a valve 33a, to a pipe 34 extending the orifice of the thrust of the blower 27. The pipe 34 bears a heating device 35 and a derivation 36, which is provided with a valve 37 and short-circuits the heating device, and it comprises also a valve 38 located between the heating device and the part of the derivation upstream from this latter. Furthermore, the pipe 21b of the converter 4b is connected, by a pipe 29b provided with a valve 30b, to the pipe 31 for evacuating the purified residual gas and, on the other hand, by a pipe 32b provided with a valve 33b, to the pipe 34 in a point of this latter located between the derivation and the pipe 32a. A pipe 39 mounted in derivation on the pipe 16, between the heat exchanger 10 and the tubing 17, connects the said pipe 39 to the pipe 26 at a point of this latter located between the condenser 28 and the blower, whereas a pipe 40 is mounted in derivation on the pipe 16 between the pipe 39 and the tubing 17 and connects the said pipe 16 to the pipe 34 at a point of this latter located between the orifice of thrust of the blower 27 and the derivation 36, the said pipe 40 being provided with a valve 41 for regulating the flow-rate.

Operating of this device can be schematically described as follows:

It is assumed that the converter 4a is in CLAUS reaction phase while the converter 4b is in regeneration phase, the valves 23a, 25b, 30a,33b and 38 being opened up while the valves 23b, 25a, 30b, 33a and 37 are shut down.

The residual gas arriving from the sulphur plant through the pipe 5, crosses through the burner 6, in which it is mixed with the combustion gases produced by this burner, which performs a combustion of a combustible gas by means of air operating in sub-stoechiometry to supply, other than calories, an appropriate quantity of $H_2$ and CO. During its passage in the burner, the residual gas is heated by the combustion gases to the temperature required for the hydrogenation, for example 200° to 400° C., and at the same time, it also receives the hydrogen and the CO produced during the combustion. The hot mixture of the residual gas and the combustion gases issued from the burner passes into the hydrogenation and hydrolysis reactor 1 containing an appropriate quantity of a catalyst adapted to promote the hydrogenation of the $SO_2$ and of the elementary sulphur into $H_2S$ as well as the hydrolysis of the COS and $CS_2$ compounds, the said catalyst being for example cobalt- and molybden-based. In the reactor 1 the sulphur-containing compounds, other than $H_2S$, present in the residual gas are quasi-completely converted into $H_2S$. The gaseous effluent issuing, through the pipe 9, from the reactor 1, of which the temperature is about 300° to 450° C., thereafter passes in to the heat exchanger 10, then into the exchanger 11, which produces low pressure steam, and then into an air-refrigerated device 12, for cooling, prior to penetrating into the washing tower 2 through the orifice 13. In this tower, the cooled hydrogenated gaseous effluent is washed by a spraying of water, carried out by the pipe 14, in order to condense the greatest proportion of the water vapor contained therein. In the head of the washing tower 2 issues a cooled gaseous effluent containing by volume less than 10% of water vapor, the said effluent being brought, along the pipe 16, to the oxidation reactor 3 after having been brought into the heat exchanger 10, at a temperature higher than 150° C., for example comprised between 180° C. and 300° C., and compatible with the maximal operating temperature of the oxidation catalyst, and having received through the pipe 17, a controlled quantity of free oxygen-containing gas and especially air to carry out the $H_2S$ oxidation in CLAUS stoechiometry, i.e. to oxidize one third of $H_2S$ into $SO_2$.

The oxidation reactor 3 contains an oxidation catalyst adapted to promote the partial oxidation of $H_2S$ in CLAUS stoechiometry, said catalyst being for example selected from among the catalysts belonging to families I) to IV) defined herein-above and advantageously consisting of a layer of a type II, III or IV catalyst followed by a layer of type I) catalyst. Through the outlet pipe 18 of the oxidation reactor 3 issues a gaseous stream containing sulphur as well as $H_2S$ and $SO_2$ in a $H_2S$:$SO_2$ molar ratio equal to about 2:1. This gaseous stream is cooled to a temperature lower than 160° C. for example between about 120° C. and 140° C., in a condenser 19; then it is introduced into the converter 4a through the pipe 22a, through a valve 23a and the pipe 20a.

In this converter, which like converter 4b contains a CLAUS catalyst such as alumina or the above-mentioned type I) catalyst, $H_2S$ and $SO_2$ contained in the gaseous stream react upon each other, upon contact with the CLAUS catalyst, in order to form sulphur according to the reaction:

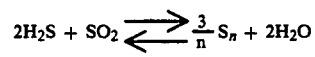

At the temperatures at which the gaseous stream is brought into contact with the CLAUS catalyst, the sulphur formed by reaction of $H_2S$ with $SO_2$ is deposited on said catalyst. Through the pipe 21a of the converter 4a issues a purified residual gas having a very low sulphur compound content, which is directed along the pipe 29a, through the valve 30a, into the evacuation pipe 31 leading said purified residual gas into a thermal or catalytic incineration reactor.

A fraction of the gaseous effluent directed towards the oxidation reaction 3, along the pipe 16, is tapped, after heating this effluent in THE heat exchanger 10 and prior to addition to the said effluent of the controlled quantity of free oxygen-containing gas and especially air, through the pipe 39, said fraction acting to form a sweeping gas stream sent by the blower 27 into the pipe 34 through the valve 38 and the heating device 35, in which this gaseous stream is heated to the appropriate temperature for the regeneration. The heated gas stream circulating in the pipe 34 is introduced into the converter 4b along the pipe 32b, through the valve 33b, and the pipe 21b, and sweeps the sulphur-laden CLAUS catalyst contained in the said converter. The sweeping gas stream carrying along the vaporized sulphur issues from the converter 4b along the pipe 20b and flows along the pipe 24b, through the valve 25b, and the pipe 26 up to the sulphur condenser 28, in which the greatest proportion of the sulphur is separated by condensation. At the outlet of the condenser 28, the sweeping gas stream, receiving the gaseous fraction tapped, through the pipe 39, on the gaseous effluent brought to the oxidation reactor, is taken up by the blower 27 in order to be sent back into the pipe 34. A proportion of the gas sent back into the pipe 34 is tapped prior to passing into the valve 38 and reintroduced through the pipe 40, with a flow-rate controlled by the valve 41, in the gaseous effluent brought to the oxidation reactor 3 by the pipe 16.

After a sufficient sweeping period of the catalyst contained in the converter 4b by the sweeping gas passing into the heating device 35 in order to fully remove the sulphur deposited on the catalyst and reactivate the said catalyst through the action of $H_2S$ contained in the sweeping gas, the valve 37 is opened up and the valve 38 shut down so as to short-circuit the heating device 35 and reduce the temperature of the sweeping gas to a value lower than 160° C. about and the sweeping operation is continued for an appropriate duration in order to cool the regenerated catalyst contained in the converter 4b.

When the said catalyst has been cooled to an appropriate temperature allowing the contacting of the catalyst with the gaseous stream issued from the oxidation reactor, the functions of the converters 4a and 4b are permutated, i.e. the converter 4b is brought into CLAUS reaction phase and the converter 4a into regeneration/cooling phase by closing down the valves 23a, 25b, 30a, 33b and 37 and opening up the valves 23b, 25a, 30b, 33a and 38 then at the cooling stage by closing down the valve 38 and opening up the valve 37. During the transient period of permutation of the role of the converters 4a and 4b, the sweeping gas is made to circulate in a pipe (not represented) by-passing these converters.

In order to complete the foregoing description, an example of carrying out the process according to the invention, is given herein-under by way of non-limitative illustration.

EXAMPLE

By means of a device similar to that schematically represented on the figure of the appended drawing and operating as described herein-above, there was treated a residual gas issued from a sulphur plant in which was carried out the partial oxidation of a sour gas containing, by volume 60.4% $H_2S$, 36.3% $CO_2$, 3.2% water and 0.1% hydrocarbons.

The residual gas to be treated had the following composition expressed in molar percentage:

| | |
|---|---|
| $H_2S$ | 0.80 |
| $SO_2$ | 0.40 |
| $S_1$ (vapor) | 0.08 |
| $CO_2$ | 16.65 |
| $H_2O$ | 29.80 |
| $N_2$ | 49.75 |
| $H_2$ | 1.93 |
| CO | 0.52 |
| COS | 0.02 |
| $CS_2$ | 0.05 |

The residual gas, arriving through the pipe 5 with a flow-rate of 223 Kmoles/hour and a temperature of about 135° C., was brought to about 350° C. in the burner 6 and entered at this temperature into the hydrogenation and hydrolysis reactor 1 containing a cobalt-/molybdenum type catalyst on alumina support.

In the reactor 1, the conversion of $SO_2$, S, COS and $CS_2$ into $H_2S$ was practically complete and the gaseous effluent issuing from the said reactor 1 had a temperature of about 380° C. and only contained $H_2S$ as its unique sulphur compound. This gaseous effluent was cooled by passage in the heat exchanger 10 then in the condenser 11 and the airrefrigerated device 12, up to about 80° C. and entered at this temperature into the washing tower 2 operating by water spraying.

At the head of the tower 2 issued a cooled gaseous stream having a temperature of about 35° C. and whose water vapor concentration was about 4.6% in volume. This cooled effluent was heated in the heat exchanger 10 to which was then added, through pipe 17, 7.61 Kmoles/hour air and the obtained mixture penetrated into the oxidation reactor 3 with a temperature of 200° C.

The catalyst used in the oxidation reactor consisted of a layer of titanium oxide stabilized by 10% by weight of calcium sulfate followed by a layer of an active alumina impregnated with iron sulfate. The contacting times of these gases passing into the oxidation reactor with the stabilized titanium oxide layer and the layer of alumina impregnated with iron sulfate were respectively of about 3 seconds and 1.5 seconds. The $H_2S$ conversion rate in the oxidation reactor represented about 72% and the gaseous stream issuing from the said reactor had a temperature of about 295° C. and contained $H_2S$ and $SO_2$ in a $H_2S:SO_2$ molar ratio equal to 2:1 with moreover a certain amount of elementary sulphur.

This gaseous stream was cooled to 130° C. in a condenser 19 in order to separate the sulphur by condensation and penetrated thereafter into the converter 4a, which as well as converter 4b, contained alumina as a CLAUS catalyst.

The purified residual gas issued from the reactor 4a and directed towards the incinerator had a temperature of about 135° C. and contained an overall content in sulfur-containing products equal to 640 ppm in volume.

The sweeping gas injected into the converter 4b for regenerating the catalyst was generated from the gaseous effluent tapped upstream from the oxidation reactor and was delivered by the blower 27 with a flow-rate of 2 500 $Nm^3/h$. The said sweeping gas was brought, by the heating device 35, to a temperature comprised between 300° and 350° C. prior to being introduced into the converter 4b in regeneration. During the cooling phase of the regenerated catalyst, the heating device 35 was by-passed and the temperature of the sweeping gas was thus about 130° C.

The flow-rate of the gas tapped through the pipe 39, on the gaseous effluent upstream from the oxidation reactor was about 250 Nm³/h and corresponded to the flow-rate of the gas reintroduced, through the pipe 40, into the said gaseous stream.

The converters 4a and 4b operated alternately for 30 hours in purification phase, i.e. in reaction phase, and for 30 hours, of which 10 hours of cooling, in regeneration/cooling phase.

The sulphur plant incorporating the foregoing process for treating residual gases according to the invention had an overall sulphur yield of 99.8% over a period of several months.

What is claimed is:

1. A process for removing sulphur-containing compounds from a cooled residual gas issued from a sulphur plant containing less than 10% water vapor and $H_2S$ as substantially the sole sulphur-containing compound with recovery of said compounds as sulphur, in which two alternating catalytic CLAUS converters are used and a CLAUS reaction is performed in one converter while regeneration and cooling is performed in the other converter, which process comprises:
   a) partially oxidizing the $H_2S$ gas by oxidizing fully one-third in an $H_2S$ atmosphere thereof by contacting the $H_2S$ gas with a limited quantity of a free oxygen-containing gas, just sufficient for completely oxidizing one-third of the $H_2S$, leaving two-thirds of the $H_2S$ gas non-oxidized, with an oxidation catalyst while operating at a temperature above 150° C., forming a gas mixture containing vaporized elemental sulphur and $SO_2$ in an $H_2S$ atmosphere with an $H_2S$ to $SO_2$ molar ratio of 2:1;
   b) cooling said mixture to a temperature below 160° C., concurrently condensing and separating from said mixture substantially all the vaporized elemental sulphur while maintaining the 2:1 molar ratio of $H_2S$ to $SO_2$, thereby forming a sulphur-free gas of two-thirds of $H_2S$ and one-third of $SO_2$,
   c) directing all of said partially oxidized, sulphur-free gas to said CLAUS converter,
   d) feeding and contacting the partially oxidized, sulphur-free gas with a CLAUS catalyst in said CLAUS converter at a sufficiently low temperature so that $H_2S$ reacts with $SO_2$ to form sulphur, which is deposited on said catalyst to produce a purified residual gas, and
   e) regenerating the sulphur-laden CLAUS catalyst by sweeping said catalyst with the residual gas issued from a sulphur plant containing less than 10% water vapor and $H_2S$ as substantially the sole sulphur-containing compound at a temperature between about 200° C. and 500° C. and recovering said sweeping gas after regeneration of the catalyst.

2. The process of claim 1 wherein steps c) and d) essentially consist of directing all said partially oxidized, sulphur-free gas and feeding said gas to said CLAUS converter.

3. The process of claim 1, without admixing to said partially oxidized sulphur-free gas, the residual $H_2S$ gas, to form gas fed to said CLAUS converter.

4. The process of claim 1, wherein the sulphur-laden CLAUS catalyst of the CLAUS converter(s) operating in the regeneration mode is regenerated by sweeping the catalyst with part of the residual gas issued from a sulphur plant containing less than 10% water vapor and $H_2S$ as substantially the sole sulphur-containing compound at a temperature between about 200° C. and 500° C. and recovering said sweeping gas after regeneration of the catalyst.

5. The process of claim 1, wherein the sulphur-laden CLAUS catalyst of the CLAUS converter(s) operating in the regeneration mode is regenerated by sweeping the catalyst with all the residual gas issued from a sulphur plant containing less than 10% water vapor and $H_2S$ as substantially the sole sulphur-containing compound at a temperature between about 200° C. and 500° C. and recovering said sweeping gas after regeneration of the catalyst.

6. The process of claim 5, wherein essentially all of the sweeping gas recovered from the regeneration of the sulphur-laden CLAUS catalyst is recycled for partial oxidization, said sweeping gas being substantially free of $SO_2$ and substantially freed of the sulphur it contained.

7. The process of claim 6, wherein the regenerated CLAUS catalyst is cooled to a suitable temperature for further contacting with the cooled partially oxidized gas.

8. The process of claim 1, wherein the CLAUS catalyst comprises at least one member selected from the group consisting of alumina, bauxite, silica, zeolite and a material consisting of at least one compound of a metal selected from the group consisting of Fe, Ni, Cu and Zn the CLAUS catalyst being in contact with a support consisting of at least one member selected from the group consisting of silica and alumina.

9. The process of claim 1, wherein the catalyst for oxidizing $H_2S$ comprises at least one compound of a metal selected from the group consisting of Fe, Ni, Co, Cu and Zn in contact with a support consisting of at least one member selected from the group consisting of alumina and silica.

10. The process of claim 1, wherein the $H_2S$ oxidation catalyst is a titanium oxide based catalyst.

11. The process of claim 1, wherein the $H_2S$ oxidation catalyst comprises at least one compound of a metal selected from the group consisting of Fe, Cu, Cd, Zn, Cr, Mo, W, Ni, and Bi in contact with a support consisting of at least one member selected from the group consisting of silica and titanium oxide.

12. The process of claim 1, wherein the $H_2S$ oxidation catalyst comprises at least one compound of a metal selected from the group consisting of Fe, Cu, Cd, Zn, Cr, Mo, W, Co, Ni, and Bi in contact with a support consisting of an active alumina thermally stabilized.

13. The process of claim 9, wherein the $H_2S$ oxidation temperature on the oxidation catalyst is between about 150° C. and 400° C.

14. The process of claim 10, wherein the $H_2S$ oxidation temperature on the oxidation catalyst is between about 150° C. and 500° C.

15. The process of claim 11, wherein the $H_2S$ oxidation temperature on the oxidation catalyst is between about 150° C. and 700° C.

16. The process of claim 12, wherein the $H_2S$ oxidation temperature on the oxidation catalyst is between about 150° C. and 1000° C.

17. The process of claim 10, wherein the $H_2S$ oxidation catalyst comprises titanium oxide and at least one alkaline-earth metal sulfate.

18. The process of claim 10, wherein the $H_2S$ oxidation catalyst comprises titanium oxide and calcium sulfate.

19. The process of claim 11, wherein the $H_2S$ oxidation catalyst also comprises at least one compound of a noble metal selected from the group consisting of Pd, Pt, Ir, and Rh.

20. The process of claim 12, wherein the $H_2S$ oxidation catalyst also comprises at least one compound of a noble metal selected from the group consisting of Pd, Pt, Ir, and Rh.

21. The process of claim 12, wherein said support consists of active alumina thermally stabilized by at least one rare-earth oxide.

22. The process according to claim 10, wherein the $H_2S$ oxidation catalyst comprises a second catalyst surface layer made of a material consisting of at least one compound of a metal selected from the group consisting of Fe, Ni, Co, Cu and Zn in contact with a support consisting of at least one member selected from the group consisting of alumina and silica.

23. The process according to claim 11, wherein the $H_2S$ oxidation catalyst comprises a second catalyst surface layer made of a material consisting of at least one compound of a metal selected from the group consisting of Fe, Ni, Co, Cu and Zn in contact with a support consisting of at least one member selected from the group consisting of alumina and silica.

24. The process according to claim 12, wherein the $H_2S$ oxidation catalyst comprises a second catalyst surface layer made of a material consisting of at least one compound of a metal selected from the group consisting of Fe, Ni, Co, Cu and Zn in contact with a support consisting of at least one member selected from the group consisting of alumina and silica.

25. The process according to claim 22, wherein the $H_2S$ oxidation temperature on the oxidation catalyst is between about 150° C. and about 400° C.

26. The process according to claim 23, wherein the $H_2S$ oxidation temperature on the oxidation catalyst is between about 150° C. and about 400° C.

27. The process according to claim 24, wherein the $H_2S$ oxidation temperature on the oxidation catalyst is between about 150° C. and about 400° C.

28. The process of claim 1, wherein the free oxygen-containing gas is air.

29. The process of claim 4, wherein the part of the residual gas for sweeping the catalyst is recycled for partial oxidation, said sweeping gas being substantially free of $SO_2$ and substantially freed of the sulphur it contained.

30. A process for removing sulphur-containing compounds from a cooled residual gas issued from a sulphur plant containing less than 10% water vapor and $H_2S$ as substantially the sole sulphur-containing compound with recovery of said compounds as sulphur, in which two alternating catalytic CLAUS converters are used and a CLAUS reaction is performed in one converter while regeneration and cooling is performed in the other converter, which process comprises:
a) feeding a stream of said $H_2S$-containing residual gas,
b) splitting the $H_2S$-containing gas into a first portion and a second portion,
c) partially oxidizing the first portion of the $H_2S$-containing gas by oxidizing fully one-third in an $H_2S$ atmosphere with a limited quantity of a free oxygen-containing gas, just sufficient for completely oxidizing one-third of the $H_2S$, leaving two-thirds of the $H_2S$ gas non-oxidized, with an oxidization catalyst while operating at a temperature above 150° C., forming a gas mixture containing vaporized elemental sulphur and $SO_2$ in an $H_2S$ atmosphere with an $H_2S$ to $SO_2$ molar ratio of 2:1,
d) cooling said mixture to a temperature below 160° C., concurrently condensing and separating from said mixture substantially all the vaporized elemental sulphur while maintaining the 2:1 molar ratio of $H_2S$ to $SO_2$, thereby forming a sulphur-free gas of two-thirds of $H_2S$ and one-third of $SO_2$,
e) directing all of said partially oxidized, sulphur-free gas to the CLAUS converter operating in reaction mode,
f) feeding and contacting the partially oxidized, sulphur-free gas with a CLAUS catalyst in said CLAUS converter in reaction mode at a sufficiently low temperature so that $H_2S$ reacts with $SO_2$ to form sulphur, which is deposited on said catalyst to produce a purified residual gas,
g) regenerating the sulphur-laden CLAUS catalyst contained in the CLAUS converter operating in regeneration mode by sweeping said catalyst with a non-oxidizing sweeping gas having added thereto the second portion of the $H_2S$-containing gas from step b), said sweeping being carried out at a temperature between about 200° C. and 500° C. and recovering said sweeping gas after regeneration of the catalyst and recirculating it for regeneration after it has been substantially freed of the sulphur it contained, said sweeping gas being substantially free of $SO_2$, and
h) recycling for partial oxidation in step c) a fraction of the sweeping gas recirculated for regeneration, said fraction having a volume substantially equal to that of the second portion of $H_2S$-containing gas from step b).

31. A process for removing sulphur-containing compounds from a cooled residual gas issued from a sulphur plant containing less than 10% water and $H_2S$ as substantially the sole sulphur-containing compound with recovery of said compounds as sulphur, in which two alternating catalytic CLAUS converters are used and a CLAUS reaction is performed in one converter while regeneration and cooling is performed in the other converter, which process comprises:
a) feeding a stream of said $H_2S$-containing residual gas to a sulphur-laden CLAUS catalyst contained in the CLAUS converter in regeneration mode,
b) regenerating the sulphur-laden CLAUS catalyst by sweeping said catalyst with all of said $H_2S$-containing gas stream at a temperature between about 200° C. and 500° C. and recovering said sweeping gas stream after regeneration of the catalyst,
c) forming an $H_2S$-containing gaseous feed consisting essentially of all the sweeping gas recovered after regeneration of the sulphur-laden CLAUS catalyst and substantially freed of the sulphur it contained, said gaseous feed being substantially freed of $SO_2$,
d) partially oxidizing the $H_2S$ gaseous feed by oxidizing fully one-third in an $H_2S$ atmosphere thereof by contacting the gaseous feed with a limited quantity of a free oxygen-containing gas, just sufficient for completely oxidizing one-third of the $H_2S$, leaving two-thirds of the $H_2S$ gas non-oxidized, with an oxidation catalyst while operating at a temperature above 150° C., forming a gas mixture containing vaporized elemental sulphur and $SO_2$ in a $H_2S$ atmosphere with an $H_2S$ to $SO_2$ molar ratio of 2:1, e) cooling said mixture to a temperature below 160° C., concurrently condensing and separating from said mixture substantially all the vaporized elemental sulphur while maintaining the 2:1 molar ratio of $H_2S$ to $SO_2$, thereby forming a sulphur-free gas of two-thirds of $H_2S$ and one-third of $SO_2$, f) directing all of said partially oxidized, sulphur-free gas to the CLAUS converter in reaction mode, and g) feeding and contacting the partially oxidized, sulphur-free gas with a CLAUS catalyst in said CLAUS converter in reaction mode at a sufficiently low temperature so that $H_2S$ reacts with $SO_2$ to form sulphur, which is deposited on said catalyst to produce a purified residual gas.

32. A process for removing sulphur-containing compounds from a cooled residual gas issued from a sulphur plant containing less than 10% water vapor and $H_2S$ as substantially the sole sulphur-containing compound with recovery of said compounds as sulphur, in which two alternating catalytic CLAUS converters are used and a CLAUS reaction is performed in one converter while regeneration and cooling is performed in the other converter, consisting essentially of:

a) partially oxidizing the $H_2S$ gas by oxidizing fully one-third in an $H_2S$ atmosphere thereof by contacting the $H_2S$ gas with a limited quantity of a free oxygen-containing gas, just sufficient for completely oxidizing one-third of the $H_2S$, leaving two-thirds of the $H_2S$ gas non-oxidized, with an oxidation catalyst while operating at a temperature above 150° C., forming a gas mixture containing vaporized elemental sulphur and $SO_2$ in an $H_2S$ atmosphere with an $H_2S$ to $SO_2$ molar ratio of 2:1;

b) cooling said mixture to a temperature below 160° C., concurrently condensing and separating from said mixture substantially all the vaporized elemental sulphur while maintaining the 2:1 molar ratio of $H_2S$ to $SO_2$, thereby forming a sulphur-free gas of two-thirds of $H_2S$ and one-third of $SO_2$, c) directing all of said partially oxidized, sulphur-free gas to said CLAUS converter, d) feeding and contacting the partially oxidized, sulphur-free gas with a CLAUS catalyst in said CLAUS converter at a sufficiently low temperature so that $H_2S$ reacts with $SO_2$ to form sulphur, which is deposited on said catalyst to produce a purified residual gas, and e) regenerating the sulphur-laden CLAUS catalyst by sweeping said catalyst with the residual gas issued from a sulphur plant containing less than 10% water vapor and $H_2S$ as substantially the sole sulphur-containing compound at a temperature between about 200° C. and 500° C. and recovering said sweeping gas after regeneration of the catalyst.

33. An apparatus for removing sulphur-containing compounds from a cooled residual gas issued from a sulphur plant containing less than 10% water vapor and $H_2S$ as substantially the sole sulphur-containing compound with recovery of said compounds as sulphur, in which two alternating catalytic CLAUS converters are used and a CLAUS reaction is performed in one converter while regeneration and cooling is performed in the other converter, which comprises:

a) means for partially oxidizing the $H_2S$ gas by oxidizing fully one-third in an $H_2S$ atmosphere thereof by contacting the $H_2S$ gas with a limited quantity of a free oxygen-containing gas, just sufficient for completely oxidizing one-third of the $H_2S$, leaving two-thirds of the $H_2S$ gas non-oxidized, with an oxidation catalyst while operating at a temperature above 150° C., so that a gas mixture containing vaporized elemental sulphur and $SO_2$ in a $H_2S$ atmosphere with an $H_2S$ to $SO_2$ molar ratio of about 2:1 is formed, b) means for cooling said mixture which consists essentially of elemental sulphur, $H_2S$ and $SO_2$ to a temperature below 160° C., so that substantially all the vaporized element sulphur is condensed and separated from said mixture, while maintaining the 2:1 molar ratio of $H_2S$ and $SO_2$, so that a sulphur-free gas is formed of two-thirds of $H_2S$ and one-third of $SO_2$, c) means for directing all of said partially oxidized, sulphur-free gas to said CLAUS converter, d) means for feeding and contacting the partially oxidized sulphur-free gas with a CLUAS catalyst in the CLAUS converter at a sufficiently low temperature, so that $H_2S$ reacts with $SO_2$ to form sulphur which is deposited on the catalyst to produce a purified residual gas, and e) means for regenerating the sulphur-laden CLAUS catalyst by sweeping said catalyst with the residual gas issused from a sulphur plant containing less than 10% water vapor and $H_2S$ as substantially the sole sulphur-containing compound at a temperature between about 200° C. and 500° C. so that said sweeping gas is recovered after regeneration of the catalyst.

34. The apparatus of claim 33, wherein the direction means includes only means for directing all of said partially oxidized, sulphur-free gas to the CLAUS converter.

35. The apparatus of claim 33, which further compriese means for regenerating the sulphur-laden CLAUS catalyst of the CLAUS converter(s) operating in the regeneration mode wherein the catalyst is swept with part of the residual gas issused from a sulphur plant containing less than 10% water vapor and $H_2S$ as substantially the sole sulphur-containing compound at a temperature between about 200° C. and 500° C., said sweeping gas is recovered after regeneration of the catalyst.

36. The apparatus of claim 33, which further comprises means for regenerating the sulphur-laden CLAUS catalyst of the CLAUS converter(s) operating in the regeneration mode wherein the catalyst is swept with all the residual gas issued from a sulphur plant containing less than 10% water vapor and $H_2S$ as substantially the sole sulphur-containing compound at a temperature between about 200° C. and 500° C., said sweeping gas is recovered after regeneration of the catalyst.

37. The apparatus of claim 33, which further comprises means for recycling essentially all of the sweeping gas recovered from the regeneration of the sulphur-laden CLAUS catalyst for partial oxidization, said sweeping gas being substantially free of $SO_2$ and substantially freed of the sulphur it contained.

38. The apparatus of claim 37, which further comprises means for cooling the regenerated CLAUS catalyst to a suitable temperature for further contacting with the cooled partially oxidized gas.

39. An apparatus for removing sulphur-containing compounds from a cooled residual gas issued from a sulphur plant containing less than 10% water vapor and $H_2S$ as substantially the sole sulphur-containing compound with recovery of said compounds as sulphur, in which two alternating catalytic CLAUS converters are used and a CLAUS reaction is preformed in one converter while regeneration and cooling is performed in the other converter, which consists essentially of:

a) means for partially oxidizing the $H_2S$ gas by oxidizing fully one-third in an $H_2S$ atmosphere thereof by contacting the $H_2S$ gas with a limited quality of a free oxygen-containing gas, just sufficient for completely oxidizing one-third of the $H_2S$, leaving two-thirds of the $H_2S$ gas non-oxidized, with an oxidation catalyst while operating at a temperature above 150° C., so that a gas mixture containing vaporized elemental sulphur and $SO_2$ in a $H_2S$ atomosphere with an $H_2S$ to $SO_2$ molar ratio of about 2:1 is formed, b) means for cooling said mixture which consists essentially of elemental sulphur, $H_2S$ and $SO_2$ to a temperature below 160° C., so that substantially all the vaporized elemental sulphur is condensed and separated from said mixture, while maintaining the 2:1 molar ratio of $H_2S$ and $SO_2$, so that a sulphur-free gas is formed of two-thirds of $H_2S$ and one-third of $SO_2$, c) means for directing all of said partially oxidized, sulphur-free gas to said CLAUS coverter, d) means for feeding and contacting the partially oxidized sulphur-free with a CLAUS catalyst in the CLAUS converter at a sufficiently low temperature, so that $H_2S$ reacts with $SO_2$ to form sulphur which is deposited on the catalyst to produce a purified residual gas, and e) means for regenerating the sulphur-laden CLAUS catalyst by sweeping said catalyst with the residual gas issued from a sulphur plant containing less than 10% water vapor and $H_2S$ as substantially the sole sulphur-containing compound at a temperature between about 200° C. and 500° C. so that said sweeping gas is recovered after regeneration of the catalyst.

* * * * *

UNITED STATES PATENT AND TRADEMARK OFFICE
CERTIFICATE OF CORRECTION

PATENT NO. : 5,185,140
DATED : February 9, 1993
INVENTOR(S) : GEORGES KVASNIKOFF ET AL It is certified that error appears in the above-indentified patent and that said Letters Patent is hereby corrected as shown below:

On the cover page, item 63, change the filing date of Serial No. 075,745 from "June 25, 1981" to --June 25, 1987--;

and in item [57], line 8 change "stoechiometry" to --stoichiometry--.

Column 1, line 20, change "$CB_2$" to --$CS_2$--.

Column 1, line 30, change "vaporisable" to --valuable--.

Column 3, line 68, change "CS" to --$CS_2$--.

Column 5, line 5, change "stoechiometry" to --stoichiometry--.

Column 16, line 20, change "CLUAS" to --CLAUS--.

Column 17, line 5, change "preformed" to --performed--.

Signed and Sealed this

Twenty-first Day of March, 1995

Attest:

BRUCE LEHMAN

*Attesting Officer*  *Commissioner of Patents and Trademarks*